United States Patent [19]
Horiuchi et al.

[11] Patent Number: 5,500,052
[45] Date of Patent: Mar. 19, 1996

[54] SOLAR PHOTOVOLTAIC POWER GENERATION DEVICE CAPABLE OF ADJUSTING VOLTAGE AND ELECTRIC POWER

[75] Inventors: Yasuo Horiuchi, Tokyo; Hitoshi Kuninaka, Kanagawa, both of Japan

[73] Assignee: NEC Corporation, Japan

[21] Appl. No.: 245,966

[22] Filed: May 19, 1994

[30] Foreign Application Priority Data

May 19, 1993 [JP] Japan .................................. 5-139953

[51] Int. Cl.⁶ .................................................. H01L 31/05
[52] U.S. Cl. ......................... 136/244; 136/293; 323/906
[58] Field of Search ............................ 136/244, 291–293; 323/906

[56] References Cited

U.S. PATENT DOCUMENTS

| | | | |
|---|---|---|---|
| 3,636,539 | 1/1972 | Gaddy | 340/870.39 |
| 4,175,249 | 11/1979 | Gruber | 323/271 |
| 5,158,250 | 10/1992 | Reboux | 244/166 |

FOREIGN PATENT DOCUMENTS

| | | | |
|---|---|---|---|
| 3912283 | 12/1989 | Germany | 136/293 |
| 56-2676 | 1/1956 | Japan . | |
| 60-180440 | 9/1985 | Japan . | |
| 3-237763 | 10/1991 | Japan | 136/293 |
| 1624567 | 1/1991 | U.S.S.R. | 136/293 |

*Primary Examiner*—Aaron Weisstuch
*Attorney, Agent, or Firm*—Ostrolenk, Faber, Gerb & Soffen

[57] ABSTRACT

In a solar photovoltaic power generation device comprising a plurality of power generation units (31–34) each of which comprises first through n-th generation elements, the first through the n-th generation elements are connected in parallel and have their polarity directed in the same direction. The plurality of power generation units are arranged so that adjacent power generation units have polarities which are opposite to each other. Each of the plurality of power generation units further comprises a plurality of switch elements, each of which has active and inactive states, for connecting the first through the n-th generation elements in series in the active state. The solar photovoltaic power generation device further comprises a power control unit (37) for controlling the plurality of switch elements for placing it into the active state in each of the plurality of power generation units.

4 Claims, 4 Drawing Sheets

SOLAR PHOTOVOLTAIC POWER GENERATION DEVICE CAPABLE OF ADJUSTING VOLTAGE AND ELECTRIC POWER

BACKGROUND OF THE INVENTION

This invention relates to a solar photovoltaic power generation device which is for converting sun's radiation into electric power. Such a solar photovoltaic power generation device is particularly useful in a power source to be loaded on a spacecraft.

Such a solar photovoltaic power generation device is disclosed in Japanese Unexamined Patent Publication Tokkai Shô 56-2676, namely, 2676/1981 and Japanese Unexamined Patent Publication Tokkai Shô 60-180440, namely, 180440/1985. The solar photovoltaic power generation device has a predetermined generation capacity defined by a maximum electric power in order to supply the electric power to various circuit devices which are installed on the spacecraft. Generally speaking, the solar photovoltaic power generation device comprises a solar cell array wherein a plurality of power generation units are parallely arranged on a circuit board. Each of the plurality of power generation units comprises a plurality of generation elements. In general, the plurality of power generation units are electrically connected in parallel and outputs the maximum electric power. Outputs of the plurality of power generation units are supplied to a DC (direct current) converter through a shunt resistor. The output is rectified and boosted by the DC converter and then supplied to the various circuit devices.

The electric power required by the various circuit devices varies with the passage of time. This means that dump power occurs in the solar cell array when the required electric power is less than the maximum electric power. In this event, the dump power must be radiated out of the spacecraft. The shunt resistor is used for radiating the dump power. Namely, the dump power is consumed by the shunt resistor and is converted into thermal energy. The thermal energy is radiated out of the spacecraft through a radiating plate connected to the shunt resistor.

Such a solar photovoltaic power generation device has, however, a degraded utilization factor of the solar cell array. Moreover, the spacecraft is influenced by the thermal energy radiated from the radiating plate. The spacecraft has increased bulk and increased weight caused by the shunt resistor and the radiating plate.

In the meanwhile, the spacecraft is influenced by various disturbances, such as the planetary magnetic field, and therefore changes in attitude. The spacecraft is therefore required to perform attitude control. The attitude control is realized by means, such as a gas jet system. However, the gas jet system requires propellant in order to carry out the attitude controll This means that the spacecraft further increases in bulk and weight.

SUMMARY OF THE INVENTION

It is therefore an object of this invention to provide a solar photovoltaic power generation device which is capable of adjusting voltage and electric power.

It is another object of this invention to provide a solar photovoltaic power generation device which is particularly useful in a power source installed on a spacecraft and which has an attitude control function of the spacecraft.

Other objects of this invention will become clear as the description proceeds.

In describing the gist of this invention, it is necessary to understand that a solar photovoltaic power generation device converts the sun's radiation into electric power and comprises a plurality of power generation units. Each of the plurality of power generation units comprises first through n-th generation elements, where n represents a positive integer greater than unity, each of which has positive and negative electrodes.

According to an aspect of this invention, the first through the n-th generation elements are connected in parallel and with their polarity directed in the same direction. The plurality of power generation units are arranged so that two adjacent power generation units have polarities which are opposite to each other. Each of the power generation units further comprises connecting means having active and inactive states for connecting the first through the n-th generation elements in series in the active state. The solar photovoltaic power generation device further comprises first control means connected to the connecting means for controlling the connecting means to place the connecting means into the active state in each of the plurality of power generation units.

Figure 1:
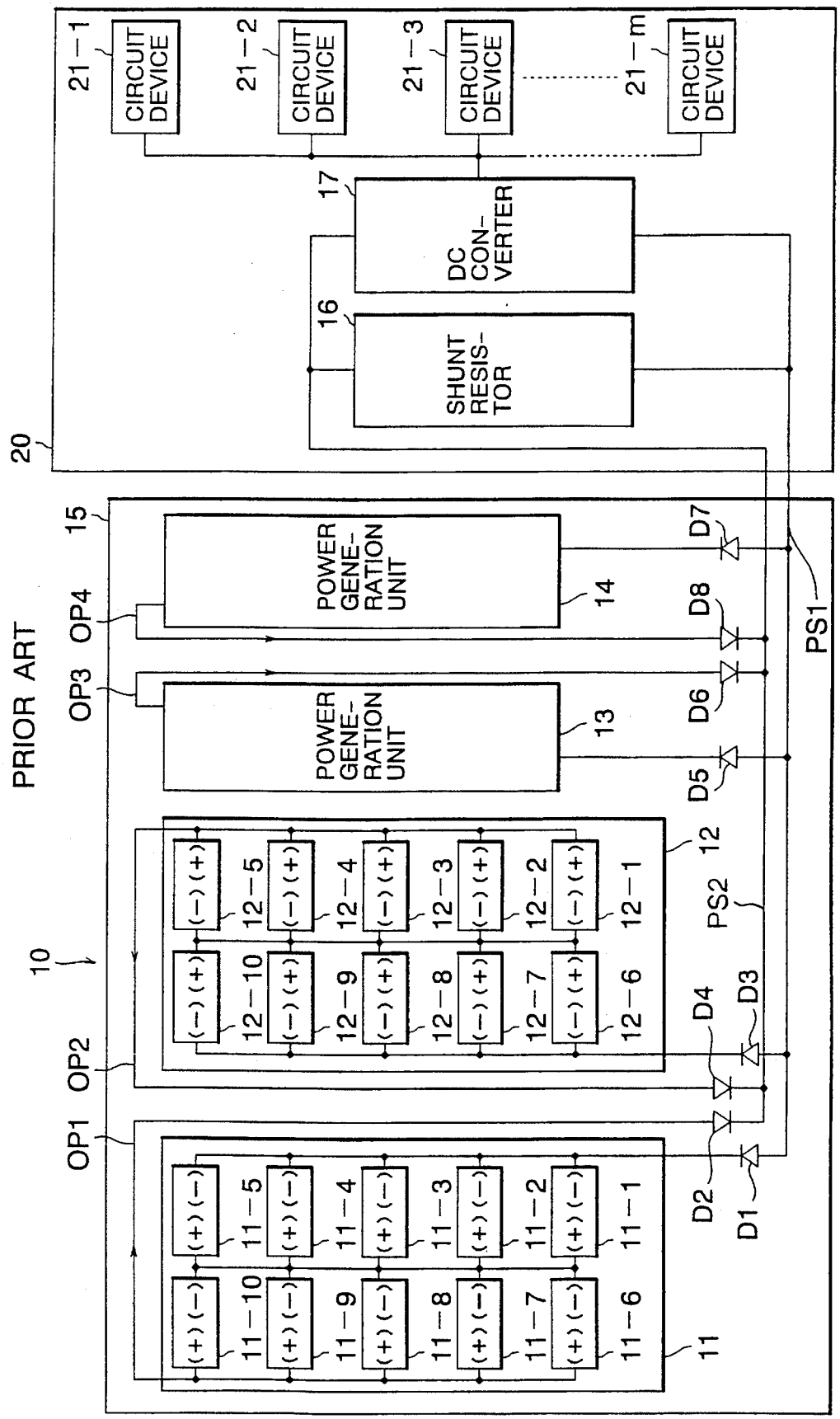
FIG. 1 shows a block diagram of a conventional solar photovoltaic power generation device.

DESCRIPTION OF THE PREFERRED EMBODIMENT:

Referring to FIG. 1, a conventional solar photovoltaic power generation device will be described at first in order to facilitate an understanding of this invention. The solar photovoltaic power generation device is installed, as a power source, on a spacecraft. In the example, the solar photovoltaic power generation device comprises a solar cell array 10 which comprises first through fourth power generation units 11 to 14. The first through the fourth power generation units 11 to 14 are parallely arranged on a circuit board 15 and are electrically connected to power supply lines PS1 and PS2 in parallel. The solar photovoltaic power generation device further comprises a shunt resistor 16 and a DC (direct current) converter 17. The spacecraft further comprises a load unit 20 which comprises first through m-th load circuit devices 21-1 to 21-m, where m represents a positive integer greater than unity.

The first power generation unit 11 comprises first through tenth generation elements 11-1 to 11-10 and a first output line OP1. Each of the first through the tenth generation elements 11-1 to 11-10 has positive and negative electrodes depicted at a plus symbol (+) and a minus symbol (−), respectively. The first through a fifth generation elements 11-1 to 11-5 are connected in parallel and form what is called a first element group. The sixth through the tenth generation elements 11-6 to 11-10 are also connected in parallel and form what called a second element group. The first element group is connected in series to the second element group. The first through the tenth generation elements 11-1 to 11-10 are arranged so that the polarities of the first through the tenth generation elements 11-1 to 11-10 are directed to the same direction, namely, the lefthand side of the drawing. In other words, the positive electrodes of the first through the tenth generation elements 11-1 to 11-10 are directed in a first or predetermined direction. The negative electrodes in the first element group are connected in common to the power supply line PS1 through a blocking diode D1. The positive electrodes in the second element group are connected in common to the power supply line PS2 through the first output line OP1 and a blocking diode D2. Thus, the first power generation unit 11 has a first current loop defined by clockwise flow of current flowing therethrough.

Like the first power generation unit 11, the second power generation unit 12 comprises first through tenth generation elements 12-1 to 12-10, each of which has positive and negative electrodes. The first through the tenth generation elements 12-1 to 12-10 are connected in a manner similar to that of the first power generation unit 11 and are arranged so that the polarities of the first through the tenth generation elements 12-1 to 12-10 are directed in the same direction, namely, the righthand side of the drawing. In other words, the positive electrodes of the first through the tenth generation elements 12-1 to 12-10 are directed to in a direction which is opposite to the the first or predetermined direction. Thus, the polarities of the first through the tenth generation elements 11-1 to 11-10 are opposite to those of the first through the tenth generation elements 12-1 to 12-10. The negative electrodes of the sixth through the tenth generation elements 12-6 to 12-10 are connected in common to the power supply line PS1 through a blocking diode D3. The positive electrodes of the first through the fifth generation elements 12-1 to 12-5 are connected in common to the power supply line PS2 through a second output line OP2 and a blocking diode D4. The second power generation unit 12 thus has a second current loop defined by counter-clockwise flow of the current flowing therethrough.

The third power generation unit 13 has the same construction as the first power generation unit 11. The negative electrodes of the first through the fifth generation elements (not shown) in the third power generation unit 13 are connected in common to the power supply line PS1 through a blocking diode D5. The positive electrodes of the sixth through the tenth generation elements (not shown) are connected in common to the power supply line PS2 through a third output line OP3 and a blocking diode D6. Thus, the third power generation unit 13 has a third current loop defined by the clockwise flow of the current flowing therethrough.

On the other hand, the fourth power generation unit 14 has the same construction as the second power generation unit 12. The negative electrodes of the sixth through the tenth generation elements (not shown) in the fourth power generation unit 14 are connected in common to the power supply line PS1 through a blocking diode D7. The positive electrodes of the first through the sixth generation elements (not shown) in the fourth power generation unit 14 are connected in common to the power supply line PS2 through a fourth output line OP4 and a blocking diode D8. Thus, the fourth power generation unit 14 has a fourth current loop defined by counter-clockwise flow of the current flowing therethrough. Thus, the solar cell array 10 is divided into four parts, namely, the first through the fourth power generation units 11 to 14. In general, each of the first through the fourth power generation units 11 to 14 is called a string.

Figure 2:
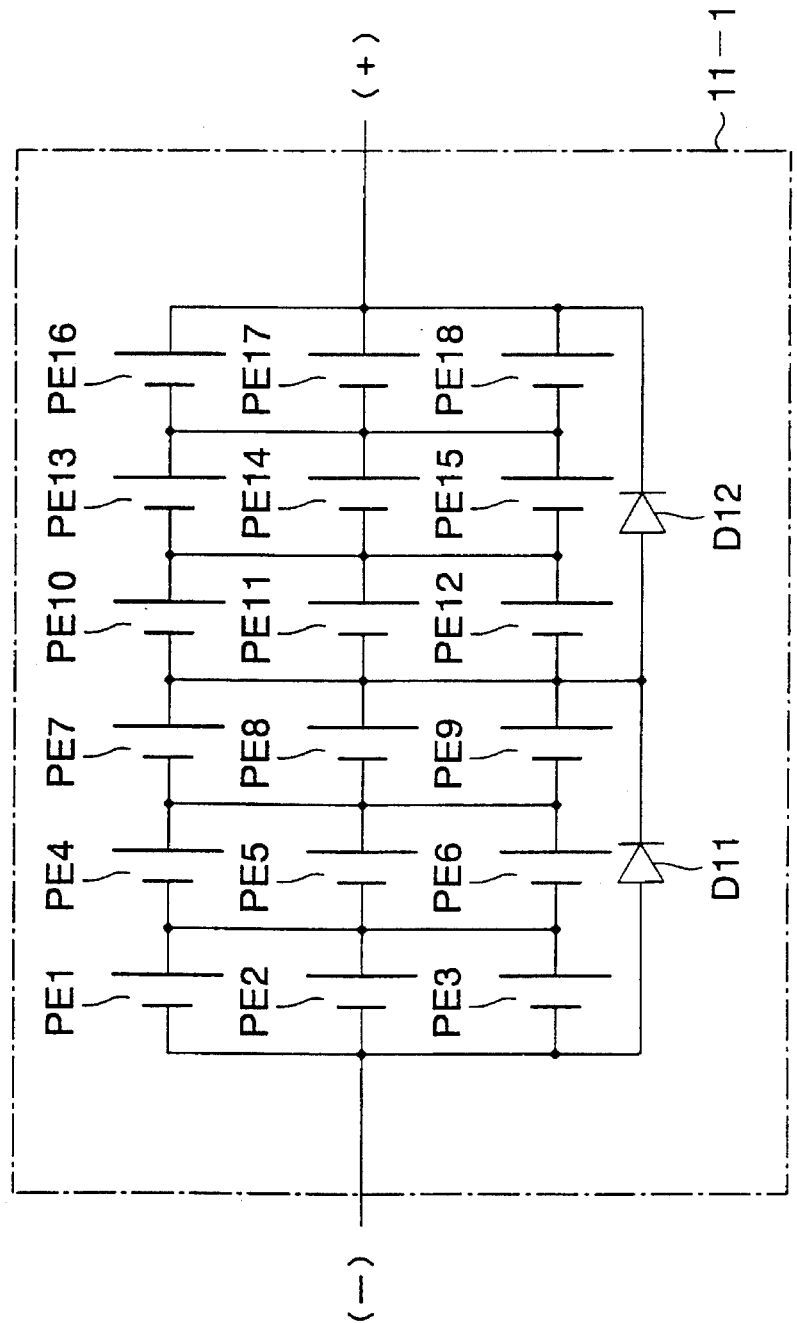
FIG. 2 shows a circuit arrangement of a generation element illustrated in FIG. 1.

Referring to FIG. 2, description will now be made as regards the first generation element 11-1. In the example, the first generation element 11-1 comprises first through eighteenth photoelectric elements PE1 to PE18 and first and second bypass diodes D11 and D12. The first through third photoelectric elements PE1 to PE3 are connected in parallel to each other and form what a first parallel group. The fourth through the sixth photoelectric elements PE4 to PE6 are connected in parallel to each other and form what is called a second parallel group. Similarly, the sixteenth through the eighteenth photoelectric elements PE16 to PE18 are connected in parallel to each other and form what is called a sixth parallel group. The first through the sixth parallel groups are connected in series. The first bypass diode D11 is connected in parallel to the first through the third parallel groups while the second bypass diode D12 is connected in parallel to the fourth through the sixth parallel groups.

As well known in the art, the first and the second bypass diodes D11 and D12 are for protecting each photoelectric element from junction destruction caused by concentration of current. Briefly, if a part of one or more generation elements is shaded, a concentration of current occurs at least at one of the partially shaded photoelectric elements. Such concentration of current is prevented by the first or the second bypass diode D11 or D12. Needless to say, the photoelectric elements are not restricted to eighteen in number.

Turning back to FIG. 1, the solar cell array 10 is connected to the shunt resistor 16 and the DC converter 17 through the power supply lines PS1 and PS2. The solar cell array 10 has a predetermined generation capacity defined by a maximum electric power and supplies the maximum electric power to the loading unit 20 as array output. The DC converter 17 is for carrying out converting operation and boosting operation. The array output is converted and boosted by the DC converter 17 and then supplied to the first through the m-th circuit devices 21-1 to 21-m.

Description will now be made regarding the reason why the solar cell array 10 is divided into four parts. One of the first through the fourth power generation units 11 to 14 may have a disabled generation element caused by ageing deterioration. For description purposes, let the first power generation unit 11 have the disabled generation element. In this event, the first power generation unit 11 is electrically isolated by the blocking diodes D1 and D2 from the second through the fourth power generation units 12 to 14. This is because the first power generation unit 11 generates a voltage lower than that of the second through the fourth power generation units 12 to 14. In this event, a reverse polarity voltage is applied to the blocking diodes D1 and D2. As a result, the first power generation unit 11 is prevented from generating electric power. Thus, the second through the fourth power generation units 12 to 14 can supply the electric power regardless of the fault in the first power generation unit 11. Namely, the blocking diodes D1 to D8 have the function of isolating the power generation unit which has the disabled generation element from the other power generation units. In other words, the solar cell array 10 has redundancy with respect to a fault in at least one of the first through the fourth power generation units 11 to 14.

Next, description is given of the reason why the solar cell array 10 includes the first and the third current loops defined by the clockwise flow of the current and the second and the fourth current loops defined by the counterclockwise flow of the current. When the first power generation unit 11 forms the first current loop, the spacecraft is influenced by a first magnetic moment given by mutual interaction between planetary magnetic field and the first current loop. As a result, the spacecraft changes in attitude due to the first magnetic moment. In order to prevent the influence caused by the first magnetic moment, the second power generation unit 12 forms the second current loop so as to generate a second magnetic moment that counterbalances the first magnetic moment. This is because the first and the second current loops are similar to each other and because the direction of current flow in the first current loop is opposite to that in the second current loop. Under the circumstances, the first and the second output lines OP1 and OP2 are arranged on the circuit board 15 so that the first and the second output lines OP1 and OP2 extended parallely near to each other. This also to the third and the fourth power generation units 13 and 14. Although the solar photovoltaic generation device mentioned above can eliminate the influence of the magnetic moment which causes variation of the attitude, the spacecraft requires an attitude control system, such as a gas jet system, in order to carry out attitude control.

Description will not be given of the shunt resistor 16. The electric power required by the first through the m-th circuit devices 21-1 to 21-m varies with the passage of time. This means that dump power occurs in the solar cell array 10 when the required electric power is less than the maximum electric power. The shunt resistor 22 is used for radiating the dump power. Namely, the dump power is consumed by the shunt resistor 22 and is converted into thermal energy. The thermal energy is radiated out of the spacecraft through a radiating plate (not shown) known in the art. However, the spacecraft is influenced by the thermal energy radiated from the radiating plate.

Furthermore, the solar photovoltaic power generation device cannot adjust the voltage and the electric power. As the spacecraft becomes large, the length of the power transmission line between the solar cell array 10 and the load unit 20 becomes long. When the power transmission distance becomes long, the transmission loss caused by a joule loss in the transmission line becomes large. The transmission loss in the transmission line further increases because the electric current also increases as the spacecraft becomes large. In this event, it is required that the electric power be transmitted in the manner of high voltage transmission in order to reduce the transmission loss. This means that the solar cell array 10 must generate electric power of a high voltage. Such a solar cell array is dangerous to repair or maintain.

Figure 3:
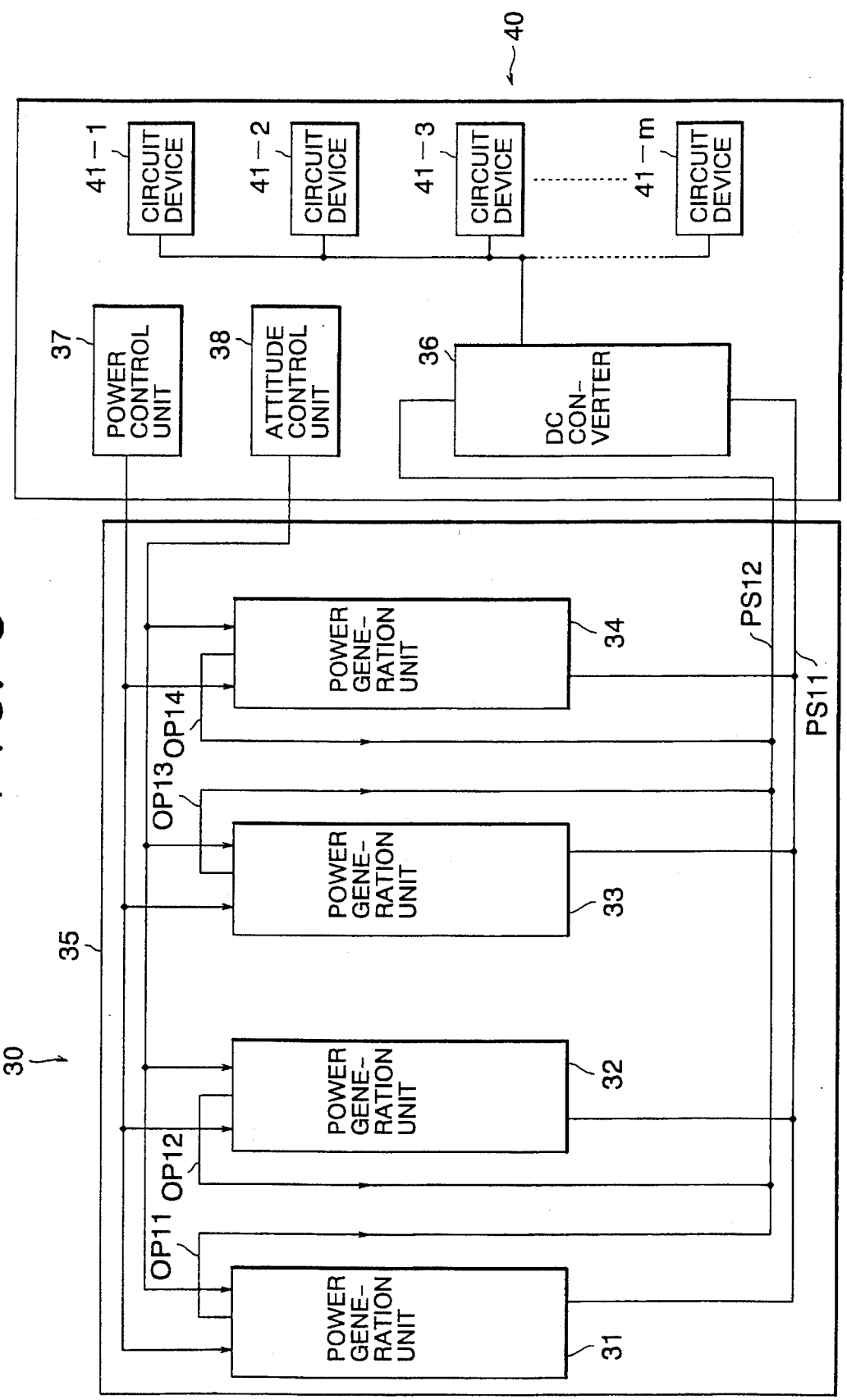
FIG. 3 shows a block diagram of a solar photovoltaic power generation device according to a preferred embodiment of this invention.

Referring to FIG. 3, description will now be given of a solar photovoltaic power generation device according to a preferred embodiment of this invention. The solar photovoltaic power generation device is particularly useful in a power source which is installed on a spacecraft. The solar photovoltaic power generation device comprises a solar cell array 30. In the example, although the solar cell array 30 comprises first through fourth power generation units 31 to 34 for convenience, the solar cell array 30 has a large number of power generation units in practice. The first through the fourth power generation units 31 to 34 are parallely arranged on a circuit board 35. The solar photovoltaic power generation device further comprises a DC converter 36, a power control unit 37, and an attitude control unit 38. A load unit 40 is installed in the spacecraft and comprises first through m-th circuit devices 41-1 to 41-m.

In the solar cell array 30, the first through the fourth power generation units 31 to 34 are connected in parallel to each other and are connected to the DC converter 42 in common through power supply lines PS11 and PS12. The solar cell array 30 supplies the maximum electric power to the load unit 40 as array output. The first through the fourth power generation units 31 to 34 are further connected to the power control unit 37 and the attitude control unit 38. The array output is rectified and boosted by the DC converter 36 and is supplied to the first through the m-th circuit devices 41-1 to 41-m.

Figure 4:
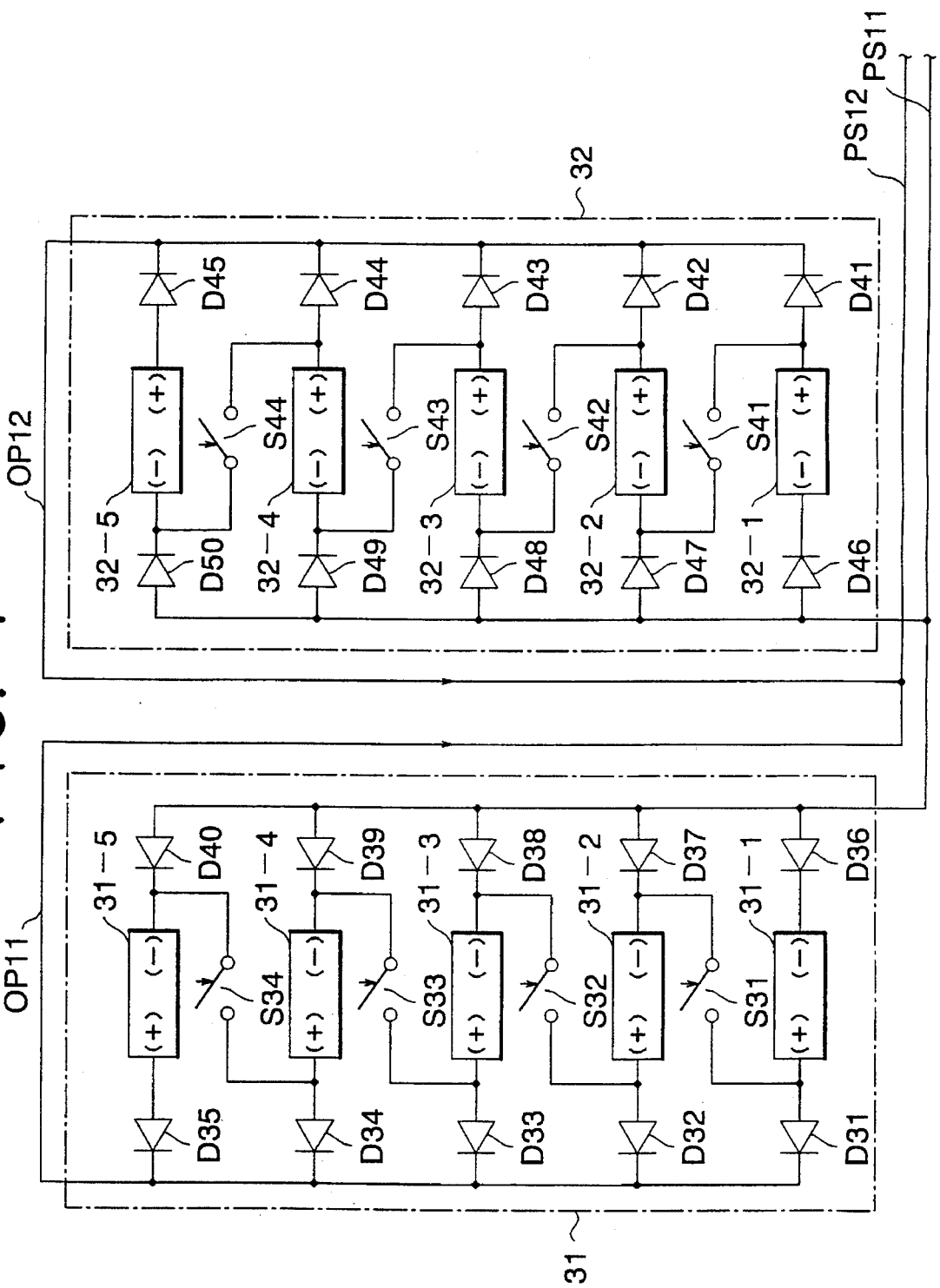
FIG. 4 shows a circuit arrangement of a pair of power generation units illustrated in FIG. 3.

Referring to FIG. 4, the first power generation unit 31 comprises first through fifth generation elements 31-1 to 31-5. Each of the first through the fifth generation elements 31-1 to 31-5 is similar to that illustrated in FIG. 2. The first through the fifth generation elements 31-1 to 31-5 are parallely arranged on the circuit board 35 (FIG. 3) so that the polarities of the first through the fifth generation elements 31-1 to 31-5 are directed to the same direction, namely, the lefthand side of the drawing. In other words, the positive electrodes of the first through the fifth generation elements 31-1 to 31-5 are directed in a prescribed direction. The first through the fifth generation elements 31-1 to 31-5 are electrically connected in parallel to each other. Each of first through fifth blocking diodes D31 to D35 is connected in series with each of the positive electrodes of the first through the fifth generation elements 31-1 to 31-5. The first through the fifth blocking diodes D31 to D35 may collectively be called a first group of diodes. Each of sixth through tenth blocking diodes D36 to D40 is connected in series with each of the negative electrodes of the first through the fifth generation elements 31-1 to 31-5. The sixth through the tenth blocking diodes D36 to D40 may collectively be called a second group of diodes. As will later become clear, the first through the tenth blocking diodes D31 to D40 are for isolating the first through the fifth generation elements 31-1 to 31-5 from one another.

The first power generation unit 31 further comprises first through fourth switch elements S31 to S34, each of which has active and inactive states, namely, on and off states. The first switch element S31 is connected between the positive electrode of the first generation element 31-1 and the negative electrode of the second generation element 31-2. The second switch element S32 is connected between the positive electrode of the second generation element 31-2 and the negative electrode of the third generation element 31-3. Likewise, the fourth-switch element S34 is connected between the positive electrode of the fourth generation element 31-4 and the negative electrode of the fifth generation element 31-5. As will later be described in detail, the first through the fourth switch elements S31 to S34 are placed in the active state by the power control unit 37 and the attitude control unit 38. The first through the fourth switch elements S31 to S34 may collectively be called a connecting unit.

It should be noted here that the positive electrodes of the first through the fifth generation elements 31-1 to 31-5 are connected in common to the power supply line PS12 through a first output line OP11. Thus, the first power generation unit 31 has a first current loop defined by clockwise flow of the current flowing therethrough.

The second power generation unit 32 has the same construction as the first power generation unit 31 except that first through fifth generation elements 32-1 to 32-5 are parallely arranged on the circuit board 35 (FIG. 3) so that the polarities of the first through the fifth generation elements 32-1 to 32-5 are directed in the same direction, namely, the righthand side of the drawing. In other words, the positive electrodes of the first through the fifth generation elements 32-1 to 32-5 are directed in a direction which is opposite to the prescribed direction mentioned in conjunction with the first power generation unit 31. Each of first through fifth blocking diodes D41 to D45 is connected in series to each of the positive electrodes of the first through the fifth generation elements 32-1 to 32-5. Each of sixth through tenth blocking diodes D46 to D50 is connected in series to each of the negative electrodes of the first through the fifth generation elements 32-1 to 32-5. The positive electrodes of the first through the fifth generation elements 32-1 to 32-5 are connected in common to the power supply line PS12 through a second output line OP12. Thus, the second power generation unit 32 has a second current loop defined by counterclockwise flow of the current flowing therethrough.

For the reason described in conjunction with FIG. 1, the first and the second output lines OP11 and OP12 are arranged on the circuit board 35 so that the first and the second output lines OP11 and OP12 parallely extend near to each other. The third power generation unit 33 is similar to the first power generation unit 31 in construction while the fourth power generation unit 34 is similar to the second power generation unit 32 in construction. The number of the generation elements are not restricted to five in number.

When the power control unit 37 places the first through the fourth switch elements S31 to S34 into the active state, the first through the fifth generation elements 31-1 to 31-5 are connected in series to each other. When the power control unit 37 places the first through the fourth switch elements S31 to S34 into the inactive state, the first through the fifth generation elements 31-1 to 31-5 are connected in parallel to each other. Likewise, the first through the fifth generation elements 32-1 to 32-5 are connected in series to each other when the power control unit 37 places the first through the fourth switch elements S41 to S44 into the active state. Otherwise, the first through the fifth generation elements 32-1 to 32-5 are connected in parallel to each other. When the first through the fifth generation elements 31-1 to 31-5 are connected in series, the first power generation unit 31 has a maximum voltage. This applies also to the second power generation unit 32.

The power control unit 37 can selectively control at least one of the first through the fourth switch elements S31 to S34. For example, when only the first switch element S31 is placed into the active state, the first and the second generation elements 31-1 to 31-2 are connected in series while the third through the fifth generation elements 31-3 to 31-5 are connected in parallel. When the first and the second switch elements S31 and S32 are placed into the active state, the first through the third generation elements 31-1 to 31-3 are connected in series while the fourth and the fifth generation elements 31-4 and 31-5 are connected in parallel. Thus, the voltage of the first power generation unit 31 steps up to the maximum voltage as the number of the switch elements in the active state increases. This also applies to the second power generation unit 32. At any rate, the power control unit 37 individually controls the first through the fourth power generation units 31 to 34 so that each of the first through the fourth power generation units 31 to 34 generates the same voltage. This means that the solar cell array 30 can change voltage such that its electric power is output constant.

If the distance between the solar cell array 30 and the load unit 40 becomes long, the power control unit 37 controls the first through the fourth power generation units 31 to 34 so that the first through the fourth power generation units 31 to 34 generate a higher voltage. Transmission of the electric power is carried out in the manner of high voltage transmission. When repair or maintenance is required, the power control unit 37 controls the first through the fourth power generation units 31 to 34 so that the first through the fourth power generation units 31 to 34 generate lower voltage in a state such that the electric power output is constant.

The required electric power from the first through the m-th circuit devices 41-1 to 41-m varies with time. When the required electric power is less than the maximum electric power, the power control unit 37 selects at least one of the first through the fourth power generation units 31 to 34. As a result, the first through the fourth power generation units 31 to 34 are divided into a selected group and a nonselected group. The selected group is used for generating electric power equal to the required electric power.

For example, when the required electric power is approximately equal to three-fourths of the maximum electric power, the power control unit 37 selects the first through the third power generation units 31 to 33 as the selected group. Subsequently, the power control unit 37 raises the voltage of the selected group(s) more than that of the nonselected group(s). Namely, the voltage of the first through the third power generation units 31 to 33 is increased to a value higher than that of the fourth power generation unit 34. In this event, the fourth power generation unit 34 is isolated from the first through the third power generation units 31 to 33 because a reverse voltage is applied to each of first through tenth blocking diodes (not shown) in the fourth power generation unit 34. In this state, the fourth power generation unit 34 effectively stops generation of electric power. Thus, the electric power output is controlled by the power control unit 37. The power control unit 37 serves as a first control unit. The first through the tenth blocking diodes of each of the first through the fourth power generation units 31 to 34 may collectively be called an isolating unit.

The description now proceeds to the attitude control unit 38. For the reason described in conjunction with FIG. 1, the first and the third power generation units 31 and 33 have a clockwise current loop while the second and the fourth power generation units 32 and 34 have a counterclockwise current loop. By the mutual interaction between the planetary magnetic field and the clockwise current loop, a clockwise magnetic moment is generated. In this case, the spacecraft receives clockwise turning force caused by the clockwise magnetic moment and turns clockwise. By the mutual interaction between the planetary magnetic field and the counterclockwise current loop, a counterclockwise magnetic moment is generated. In this event, the spacecraft receives a counterclockwise turning force caused by the counterclockwise magnetic moment and turns counterclockwise.

The attitude control unit 38 is connected to an attitude detector (not shown) for detecting the attitude of the spacecraft and receives an attitude detection signal from the attitude detector. The attitude control unit 38 monitors the attitude of the spacecraft by the use of attitude detection signal. When the spacecraft requires the clockwise turning force, the attitude control unit 38 places the first and the third power generation units 31 and 33 into the active state and places the second and the fourth power generation units 32 and 34 into the inactive state. In other words, the attitude control unit 38 places the first through the fourth switch elements of the first and the third power generation units 31 and 33 into the active state. The attitude control unit 38 also places the first through the fourth switch elements of the second and the fourth power generation units 32 and 34 into the inactive state. As a result, the spacecraft turns clockwise.

On the other hand, when the spacecraft requires the counterclockwise turning force, the attitude control unit 38 places the second and the fourth power generation units 32 and 34 into the active state and places the first and the third power generation units 31 and 33 into the inactive state. In this event, the first through the fourth switch elements of the second and the fourth power generation units 32 and 34 are placed into the active state while the first through the fourth switch elements of the first and the third power generation units 31 and 33 placed into the inactive state. Thus, the spacecraft turns counterclockwise. As mentioned above, the attitude control unit 38 controls the attitude of the spacecraft by the use of the first through the fourth power generation units 31 to 34. The attitude control unit 38 serves as a second control unit.

While this invention has thus far been described in conjunction with a preferred embodiment thereof, it will readily be possible for those skilled in the art to practive this invention in various other manners. For example, although the positive electrodes in the first power generation unit 31 are directed to the lefthand side of the drawing, the negative electrodes in the first power generation unit 31 may be directed to the lefthand side of the drawing. In this case, the connection of the first through the tenth blocking diodes D31 to D40 is modified so that each of cathodes thereof are directed to the righthand side of the drawing. The first output line OP11 serves as a first input line.

What is claimed is:

1. A solar photovoltaic power generation device for converting the sun's radiation into electric power, comprising:

first through n-th generation elements, where n represents a positive integer greater than unity, each element having positive and negative electrodes, said first through n-th generation elements being connected in parallel and having their polarity directed in the same direction;

connecting means having active and inactive states for connecting said first through said n-th generation elements in series in said active state;

control means connected to said connecting means for controlling said connecting means to place said connecting means into said active state;

a first group of diodes, each of said first group of diodes being connected in series to a positive electrode of one of said first through n-th generation elements; and a second group of diodes, each of said second group of diodes being connected in series to a negative electrode of one of said first through n-th generation elements;

said connecting means having first through (n−1)th switch elements, each of said first through (n−1)-th switch elements being connected between said positive electrode of one of said first through said n-th generation elements and said negative electrode of the next one of said first through said n-th generation elements.

2. A solar photovoltaic power generation device for converting the sun's radiation into electric power, comprising:

a plurality of power generation units, each of said plurality of power generation units having first through n-th generation elements, where n represents a positive integer greater than unity, each generation element having positive and negative electrodes, said first through n-th generation elements being connected in parallel and having their polarity directed in the same direction, said plurality of power generation units being arranged so that two adjacent ones of said plurality of power generation units have polarities which are opposite to each other;

each of said plurality of power generation units further having connecting means having active and inactive states for connecting said first through n-th generation elements in series in said active state;

each of said plurality of power generation units further having a first group of diodes each of which is connected in series to a positive electrode of one of said first through n-th generation elements and a second group of diodes each of which is connected in series to a negative electrode of one of said first through said n-th generation elements;

first control means connected to said connecting means for controlling said connecting means to place said connecting means into said active state in each of said plurality of power generation units;

said connecting means having first through (n−1)-th switch elements, each of said switch elements being connected between said positive electrode of one of first through n-th generation elements and said negative electrode of the next one of said first through n-th generation elements.

3. A solar photovoltaic power generation device as claimed in claim 2, wherein said first control means selectively controls said first through (n−1)-th switch elements in each of said plurality of power generation units to adjust the voltage and the electric power output therefrom.

4. A solar photovoltaic power generation device as claimed in claim 3, wherein each of said plurality of power generation units has a current loop defined by flow of current flowing therethrough, and said device further includes second control means selectively controlling said first through said (n−1)-th switch elements in each of said plurality of power generation units to provide said current loop.

* * * * *